Figure 1:
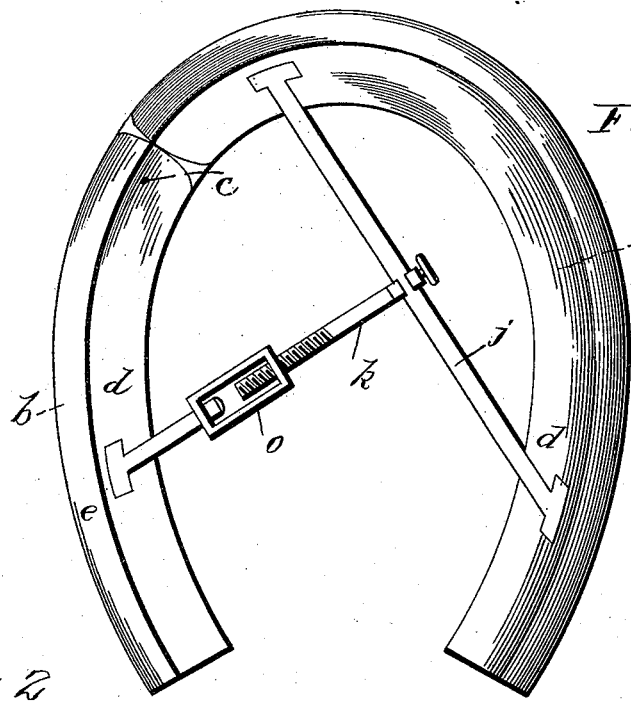

(No Model.) 2 Sheets—Sheet 1.

C. F. COCHRAN.
HORSESHOE.

No. 430,069. Patented June 10, 1890.

Witnesses
C. C. Burdine
H. E. Peck

Inventor
C. F. Cochran,
By his Attorney
O. E. Duff (No Model.) 2 Sheets—Sheet 2.
C. F. COCHRAN.
HORSESHOE.
No. 430,069. Patented June 10, 1890.
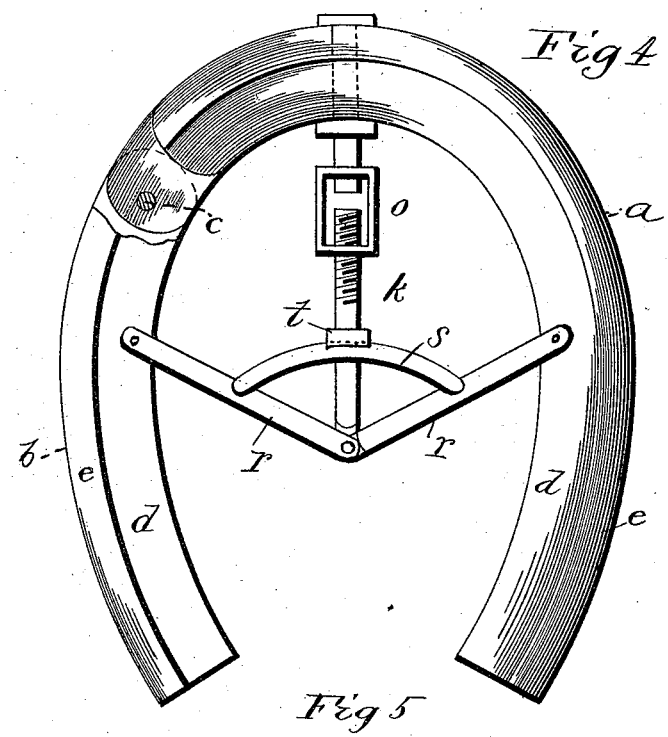
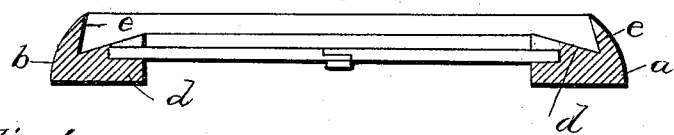
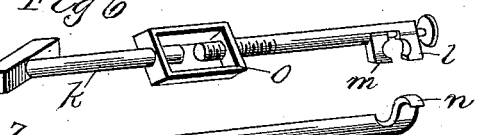
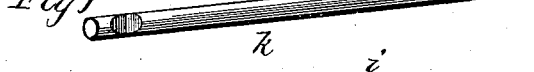
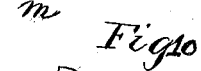
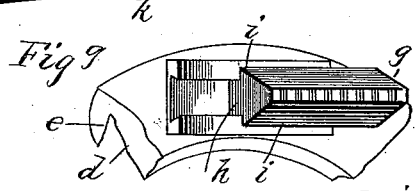
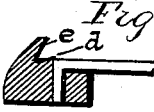
Witnesses
C. C. Burdue
H. E. Peck
Inventor:—
C. F. Cochran,
By his Attorney.
J. E. Duffy
THE NORRIS PETERS CO., PHOTO-LITHO., WASHINGTON, D. C.

UNITED STATES PATENT OFFICE.

CLARENCE F. COCHRAN, OF WEST BRANCH, MICHIGAN.

HORSESHOE.

SPECIFICATION forming part of Letters Patent No. 430,069, dated June 10, 1890.

Application filed January 10, 1890. Serial No. 336,467. (No model.)

*To all whom it may concern:*

Be it known that I, CLARENCE F. COCHRAN, of West Branch, in the county of Ogemaw and State of Michigan, have invented certain new and useful Improvements in Horseshoes; and I do hereby declare that the following is a full, clear, and exact description of the invention, which will enable others skilled in the art to which it appertains to make and use the same, reference being had to the accompanying drawings, and to the letters of reference marked thereon, which form part of this specification.

This invention relates to certain improvements in horseshoes.

The object of the invention is to provide an improved horseshoe, so constructed as to be easily and readily attached to the hoof without cutting or shaving the hoof, and without the use of nails or other securing means which are driven into or injure the hoof.

A further object is to provide an improved shoe, simple, cheap, easy to manufacture, and durable in construction, particularly adapted for use with and as a preventive for cracked or injured hoofs, and which will not interfere with or strike the frog of the foot, and can be readily and quickly attached to or removed from the hoof.

These objects are accomplished by and this invention consists in certain novel features of construction and in combinations of parts more fully and particularly pointed out hereinafter.

Referring to the accompanying drawings, Figures 1, 2, 3, and 4 are top plans of shoes embodying my invention, but varying in construction. Fig. 5 is a section of the shoe. Figs. 6 and 7 are detail perspectives of two different constructions of securing rod or brace. Fig. 8 is a section of an end of the rod of Fig. 6, showing the means by which it is fastened to the spring. Fig. 9 is a detail perspective of the under side of the toe of the shoe, showing the calk partially removed for its seal. Fig. 10 is a similar view of one of the heel-calks. Fig. 11 is a cross-section of one of these calks. Fig. 12 is a section of the shoe, showing a different fastening for the securing-rod.

The shoe is constructed of about the contour and shape of an ordinary horseshoe. The shoe is composed of two sections or members $a$ $b$, hinged together, so that the shoe can be enlarged laterally or the heels thereof drawn together toward each other. The section $a$ forms one leg, and the toe of the shoe and the section $b$ forms the other leg of the shoe. These two sections are hinged together at $c$, preferably by means of the overlapping ends and a pivot-pin, as shown, so that the joint will be rigid and strong and allow the ends of the shoe to only move to and from each other. It will be observed that the pivotal point or hinge is located a distance to one side of the toe of the shoe. The upper face $d$ of the shoe is beveled or inclined from the inner edge downwardly, so as to fit the bottom face of the outer edge of the hoof.

The shoe is provided with a continuous (except at the pivotal point) upwardly-extending flange $e$, extending up from the outer edge of the shoe at an angle to extend upwardly around and snugly fit the hoof. This flange is of sufficient width to extend up the desired distance on the hoof to rigidly hold the shoe thereon when the legs thereof are drawn together and secured, and the flange is of the proper angle to snugly fit the hoof. The under face of the toe of the shoe and also the under faces of the ends of the two legs or heels of the shoe are provided with flanges forming undercut slots to receive the heel-calks $f$ and the toe-calk $g$. These calks are provided with dovetailed portions or bases $h$ and square shoulders $i$, and the calks are secured to the shoes by having their bases driven into said slots from the sides, with their shoulders $i$ resting on the top of the flanges forming said slots. These calks cannot slip out and are usually constructed of taper form, as shown, and of hard steel or iron.

The shoe is adjusted and secured upon the hoof by the arrangements shown in the first four figures. In these figures the reference-letter $j$ indicates a spring-rod, at one end secured to the member $a$ on the pivotal end of the toe, and from thence extending diagonally and secured to said member near the end or heel thereof. The ends of this rod are provided with suitable lugs or tongues, which are fitted in corresponding sockets or mortises in the upper faces of the shoe members, so that the top surface of the rod will be flush with or below the plane of the upper face of the shoe, and hence will not strike the foot of the animal. A tightening or brace rod $k$ is at one end secured to said spring-rod at or about the center thereof and extends diagonally across the space between the shoe-legs and at its opposite end is secured to the member $b$ near its heel in a similar manner to the fastening of the spring-rod and so as to be in the same plane with said rod. This securing-rod is formed at its end, so that it can be readily attached to or detached from the spring of the main member of the shoe. In Fig. 12 the rod has a bent end entering a hole in the top face of the shoe. This securing-rod can be formed at its end, as shown in Figs. 1, 3, 6, and 8, with a rigid hook $l$ and a sliding jaw $m$, adjustable by means of a screw and nut, as shown. By this construction this rod can be easily detached from or rigidly clamped to the spring.

Figure 2:
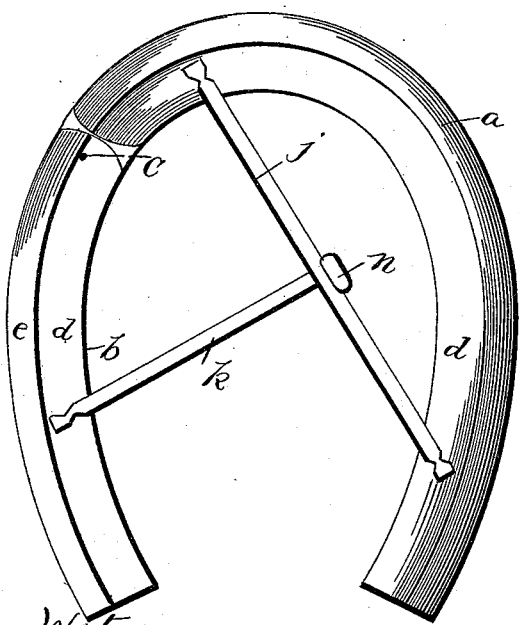

In Figs. 2 and 7 a single integral securing-rod is shown, having its end bent to form a hook $n$ to fit the spring, as clearly shown. This securing-rod, as shown in several of the figures, can be provided with a swivel $o$, by which the tension of the shoe on the foot can be regulated.

Figure 3:
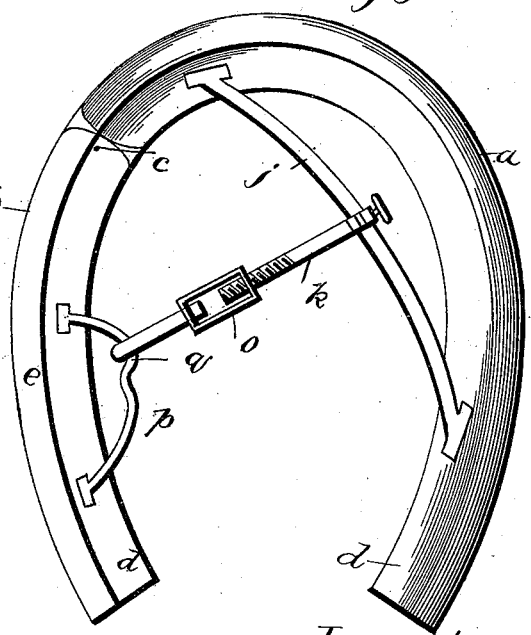

In Fig. 3 the shoe is provided with a spring-connection between the two members, so that the securing-rod is thrown forward out of the way of the frog of the foot. This is accomplished by means of the curved spring $p$, secured at its ends to the small member of the shoe near the ends thereof and having the bent or angular portion $q$, which the hook on the end of the securing-rod engages. Thus it will be seen that this rod is yieldingly secured to the shoe member and is thrown up toward the toe, as otherwise the end of the securing-bar would have to be secured at about the same point as the lower end of the spring $p$.

In Fig. 4 the securing-rod is fastened to the toe of the shoe, and at its opposite end is pivoted to the two toggle-links $r$ $r$, pivoted at their outer ends to the legs of the shoe members in a suitable manner, so that when the securing-rod is lengthened by its swivel the toggle-links will be drawn down and the two members of the shoe drawn toward each other. A spring $s$ at its center bears against a shoulder $t$ on the securing-rod and has its opposite grooved ends bearing on the two toggle-links, as clearly shown, so that the spring will be flattened against its tension when the device is operated to draw the legs together. The outer end of the securing-rod of this construction is provided with a shoulder bearing against the inner edge of the toe of the shoe, and the end of the rod extends through the shoe and is upset on the outer edge of the same.

The operation of this invention is obvious. When it is desired to place the shoe on the hoof, the securing devices are adjusted to allow the legs of the shoe to swing apart. The shoe is then slipped upon the hoof and the securing devices tightened to securely hold the shoe thereon. By reason of the spring securing devices and the upwardly-projecting flange the shoe is a great protection to the animal's hoof, particularly when tender, thin-shelled, injured, or cracked, and it is also very easy on the foot, as by reason of the spring securing devices and the divided hinged shoe the shoe yields to the hoof as it tends to spread on hard roads. No nails or such securing devices are necessary to be driven into and injure the hoof. This shoe can be made of suitable metal and each member can be made integral or of separate parts.

It is evident that various changes might be resorted to in the form and arrangements of the parts described without departing from the spirit and scope of my invention; hence I do not limit myself to the exact constructions herein set forth.

What I claim is—

1. A horseshoe comprising two hinged members having the upwardly-projecting flange, a securing-bolt to clamp said members together on the hoof, and a spring secured to one of said members and connecting the bolt thereto, substantially as described.

2. A horseshoe consisting of two hinged members, a spring-bar secured to one member, and the securing-rod secured to the other member and said bar within its length, substantially as described.

3. A horseshoe consisting of the two hinged members, the longitudinally-adjustable securing-bar for said members, and the spring or springs whereby the members are allowed a yielding spread when secured, substantially as described.

4. A horseshoe consisting of hinged members, the inwardly-inclined flange extending up from and around the outer edge of the shoe, the upper face of the shoe being beveled or inclined from the inner edge downwardly toward said flange and forming an acute angle therewith, and securing-rods having tongues or lugs at their ends, and sockets in the upper face of the shoe in which to secure the rods in planes below said upper face, for the purpose set forth.

5. An expansible shoe consisting of the pivoted members having the upwardly-extending flange to fit the hoof, and spring or yielding securing rods or connections in the space within the shoe and beneath the hoof, arranged to hold the members together and secure the shoe on the hoof and allow the same to yield laterally.

6. A horseshoe consisting of two members hinged together with the pivoted point on one side of the toe, the upwardly-extending flange, a spring-bar at its ends secured to one member near its toe and heel, respectively, and a securing-rod at one end secured to the other member and at its other end secured to said bar near its center.

7. A horseshoe consisting of hinged members having the upwardly-extending flange, a securing-bolt secured to one of said members and having an adjustable swivel, and spring or yielding connections from said bolt to the other member or members, for the purpose set forth.

In testimony that I claim the foregoing as my own I affix my signature in presence of two witnesses.

CLARENCE F. COCHRAN.

Witnesses:
JOHN TOLFREE,
SANFORD BRADSHAW.